US012609572B2

(12) United States Patent
Kim et al.

(10) Patent No.: US 12,609,572 B2
(45) Date of Patent: Apr. 21, 2026

(54) STATOR OF ROTATING ELECTRIC MACHINE

(71) Applicant: LG MAGNA E-POWERTRAIN CO., LTD., Incheon (KR)

(72) Inventors: Seokhwan Kim, Incheon (KR); Sehoon Yoo, Incheon (KR); Ning Wang, Incheon (KR); Jiwon Lee, Incheon (KR); Changmin Park, Incheon (KR); Jaeung Lee, Incheon (KR)

(73) Assignee: LG ELECTRONICS INC., Seoul (KR)

( * ) Notice: Subject to any disclaimer, the term of this patent is extended or adjusted under 35 U.S.C. 154(b) by 307 days.

(21) Appl. No.: 18/269,514

(22) PCT Filed: Dec. 23, 2021

(86) PCT No.: PCT/KR2021/019699
§ 371 (c)(1),
(2) Date: Jun. 23, 2023

(87) PCT Pub. No.: WO2022/139501
PCT Pub. Date: Jun. 30, 2022

(65) Prior Publication Data
US 2024/0322632 A1     Sep. 26, 2024

(30) Foreign Application Priority Data

Dec. 23, 2020    (KR) ........................ 10-2020-0181802

(51) Int. Cl.
*H02K 3/40*               (2006.01)
(52) U.S. Cl.
CPC ...................................... *H02K 3/40* (2013.01)
(58) Field of Classification Search
CPC .. H02K 3/30; H02K 3/32; H02K 3/40; H02K 3/12
See application file for complete search history.

(56) References Cited

U.S. PATENT DOCUMENTS 2,913,607 A      11/1959  Douglas et al.
4,269,894 A  *   5/1981  Sakai ........................ H02K 3/30
                                                    174/120 SR
(Continued)

FOREIGN PATENT DOCUMENTS

JP           09191618        7/1997
JP          2000299947      10/2000
(Continued)

OTHER PUBLICATIONS

U.S. Appl. No. 17/422,125, filed Jul. 24, 2020, Seoul, Hyunsoo.*
(Continued)

*Primary Examiner* — Christopher M Koehler
*Assistant Examiner* — Ahmed F Seck
(74) *Attorney, Agent, or Firm* — LEE, HONG, DEGERMAN, KANG & WAIMEY

(57)                    ABSTRACT

The present invention relates to a stator of a rotating electric machine, including: a stator core having a plurality of slots; and a stator coil configured by connecting a plurality of conductor segments including: one or more first-type conductor segments each having a conductor and a first sheath part surrounding and insulating an outer surface of the conductor; and one or more second-type conductor segments each having the conductor, the first sheath part, and a second sheath part surrounding and insulating a part of an outer surface of the first sheath part, wherein each of the conductor segments includes two insertion parts configured to be inserted into different slots among the plurality of slots; a crown part connecting respective first ends of the two insertion parts; and welding parts extending from respective second ends of the two insertion parts to be connected by welding, and wherein the second-type conductor segment is disposed in a section having a relatively high voltage (Continued)

distribution ratio. Therefore, during high voltage application, partial discharge can be prevented.

13 Claims, 17 Drawing Sheets

(56) References Cited

U.S. PATENT DOCUMENTS

| | | | | |
|---|---|---|---|---|
| 4,337,567 | A * | 7/1982 | Lugosi | H02K 3/14 |
| | | | | 505/928 |
| 10,715,001 | B2 * | 7/2020 | Nakayama | H02K 1/16 |
| 2005/0258704 | A1 | 11/2005 | Oohashi et al. | |
| 2009/0079287 | A1 | 3/2009 | Hattori et al. | |
| 2016/0197523 | A1 * | 7/2016 | Hosek | H02K 1/02 |
| | | | | 310/43 |
| 2017/0178765 | A1 * | 6/2017 | Ikeda | H01B 3/427 |
| 2019/0027979 | A1 | 1/2019 | Sakamoto et al. | |
| 2019/0267861 | A1 * | 8/2019 | Nakayama | H02K 3/38 |

FOREIGN PATENT DOCUMENTS

| | | |
|---|---|---|
| JP | 2004312790 | 11/2004 |
| KR | 1019990065556 | 8/1999 |
| KR | 10-2001-0067217 | 7/2001 |
| KR | 1020030011184 | 2/2003 |
| KR | 10-2004-0032625 | 4/2004 |
| KR | 10-2006-0022938 | 3/2006 |
| KR | 1020060131283 | 12/2006 |
| KR | 1020080090039 | 10/2008 |
| KR | 20100008712 | 1/2010 |
| KR | 1020100029616 | 3/2010 |
| KR | 10-2011-0000009 | 1/2011 |
| KR | 10-2016-0133518 | 11/2016 |
| KR | 1020180055171 | 5/2018 |
| KR | 1020180094446 | 8/2018 |
| KR | 10-2019-0026017 | 3/2019 |
| KR | 10-2020-0085562 | 7/2020 |
| KR | 10-2020-0141209 | 12/2020 |
| WO | WO2020162333 A1 * | 8/2020 ............... H02K 3/12 |

OTHER PUBLICATIONS

WO2020162333A1_-_Translation.pdf (Year: 2025).*
Korean Intellectual Property Office Application No. 10-2023-7001829, Office Action dated Jul. 15, 2024, 7 pages.
Korean Intellectual Property Office Application No. 10-2023-7001828, Office Action dated Jul. 15, 2024, 7 pages.
PCT International Application No. PCT/KR2021/019699, International Search Report dated Apr. 12, 2022, 13 pages.
PCT International Application No. PCT/KR2021/019697, International Search Report dated Apr. 12, 2022, 9 pages.
PCT International Application No. PCT/KR2021/095131, International Search Report dated Apr. 18, 2022, 11 pages.
Korean Intellectual Property Office Application No. 10-2023-7001829, Office Action dated Feb. 15, 2025, 7 pages.

* cited by examiner

*FIG. 5*

STATOR OF ROTATING ELECTRIC MACHINE

CROSS-REFERENCE TO RELATED APPLICATIONS

This application is the National Stage filing under 35 U.S.C. 371 of International Application No. PCT/KR2021/019699, filed on Dec. 23, 2021, which claims the benefit of earlier filing date and right of priority to Korean Application No. 10-2020-0181802, filed on Dec. 23, 2020, the contents of which are all hereby incorporated by reference herein in their entirety.

TECHNICAL FIELD

The present disclosure relates to a stator of a rotating electric machine.

BACKGROUND ART

As is well known, a rotating electric machine refers to a machine having a stator and a rotor provided to be rotatable with respect to the stator.

A part of the rotating electric machine is configured with a generator that converts mechanical energy into electrical energy, and another part thereof is configured with an electric motor that converts electrical energy into mechanical energy. Still another part of the rotating electric machine may be selectively configured to function as an electric motor or a generator, respectively.

The stator of the rotating electric machine is configured with a stator core having slots and teeth and a stator coil wound by way of the slots.

The stator of the rotating electric machine is advantageous for increasing output power as a ratio (fill factor, occupancy ratio) of a cross-sectional area of a conductor of the stator coil to an internal area of the slot is high.

In consideration of this, some stators use a stator coil in which conductor segments, so-called "hairpins", made by bending a rectangular copper wire with a relatively large conductor cross section into a "U" shape, are connected in a preset pattern.

The conductor segment is typically provided with a conductor having a rectangular cross section and a coating formed of an insulating material surrounding an outer surface of the conductor.

The conductor segment is provided with a pair of insertion parts respectively inserted into different slots of the stator core, a crown part connecting the pair of insertion parts, and welding parts conductively connected by welding or the like by bending the ends of the pair of insertion parts.

Meanwhile, as a voltage applied to an electric vehicle driving system increases, when a high voltage is applied due to an increase in voltage applied to the stator coil, a partial discharge due to a high voltage surge may occur.

However, in such a stator of the rotating electric machine in the related art, when a coating thickness of the hairpin is increased to enhance the insulation performance of the stator coil, a space factor of the conductor to a cross-sectional area of the slot is decreased to that extent, and due to this, there is a problem in that the output power of the rotating electric machine is lowered.

Furthermore, in such a stator of the rotating electric machine in the related art, an insulating member is individually inserted into and fixed to an intersection region of the conductor segment such that the partial discharge due to the high voltage surge can be suppressed, thus there is a problem in that a process of winding the stator coil requires a lot of time and effort.

In particular, the crown part connecting two insertion parts is connected to each other, and in the case of a conductor segment having a relatively large cross-sectional area, a lot of force is required to bend or deform the conductor, so there is a problem in that it is not easy to secure a space for inserting an insulating member between two conductor segments that intersect with each other.

In addition, nonetheless, when deformation occurs due to the action of a small external force to the insulating member inserted between the two conductor segments that intersect with each other, the insulating member inserted into the intersection region of the crown part may be easily released from an initial coupling position, and due to this, there is a problem in that a partial discharge may occur in the intersection region of the two conductor segments.

Accordingly, an aspect of the present disclosure is to provide a stator of a rotating electric machine capable of suppressing the occurrence of a partial discharge when a high voltage is applied thereto.

Furthermore, another aspect of the present disclosure is to provide a stator of a rotating electric machine capable of improving insulation performance without reducing space factor.

In addition, still another aspect of the present disclosure is to provide a stator of a rotating electric machine that facilitates a process of winding the stator coil and allows a high voltage to be applied thereto.

SUMMARY

A stator of a rotating electric machine according to an embodiment of the present disclosure may include a first-type conductor segment having a conductor and a first sheath part surrounding the conductor, and a second-type conductor segment having the conductor, the first sheath part, and a second sheath part surrounding a part of a circumference of the first sheath part.

Specifically, the stator coil may be configured by connecting a plurality of conductor segments, which include two insertion parts inserted into different slots of the stator core, a crown part connecting respective first ends of the two insertion parts, and welding parts extending from respective second ends of the two insertion parts to be connected by welding, wherein the plurality of conductor segments includes one or more first-type conductor segments each having a conductor and a first sheath part surrounding and insulating an outer surface of the conductor; and one or more second-type conductor segments each having the conductor, the first sheath part, and a second sheath part surrounding and insulating a part of an outer surface of the first sheath part, and the second-type conductor segment is disposed in a section having a high voltage distribution ratio, thereby suppressing the occurrence of partial discharge.

The stator of the rotating electric machine may include a stator core having a plurality of slots and teeth; and a stator coil configured by connecting a plurality of conductor segments, which are respectively configured to have two insertion parts inserted into different slots among the plurality of slots, a crown part connecting the two insertion parts, and welding parts extending from the two insertion parts to be connected by welding, wherein the conductor segment includes a first-type conductor segment having a conductor and a first sheath part surrounding and insulating an outer surface of the conductor; and a second-type conductor segment having the conductor, the first sheath part, and a second sheath part surrounding and insulating a part of an outer surface of the first sheath part, and the second-type conductor segment is disposed in a section having a relatively high voltage distribution ratio.

Accordingly, when a high voltage is applied, the occurrence of partial discharge due to a high voltage surge may be suppressed.

Furthermore, the second-type conductor segment may include a first sheath part and a second sheath part to suppress a process of inserting an insulating member during the process of winding the stator coil, thereby reducing the process time of winding the stator coil.

In the stator of the rotating electric machine according to the present disclosure, the second-type conductor segment having high insulation performance may be disposed in a section having a relatively high voltage distribution ratio, among stator coil sections connected in series to one another, and the first-type conductor segment having relatively low insulation performance may be disposed in a section having a low voltage distribution ratio, thereby allowing the stator to be applied to a high voltage motor that can be operated at high voltage (e.g. 800V system).

In one embodiment of the present disclosure, the stator coil may include a plurality of phase power lines connected to three-phase (U-phase, V-phase, W-phase) AC power source and a plurality of phase coils connected to the plurality of phase power lines.

In the present embodiment, the stator coil may be connected to an inverter (device) providing three-phase AC power.

The plurality of phase power lines of the stator coil include a U-phase power line, a V-phase power line, and a W-phase power line, and the plurality of phase coils include a U-phase coil, a V-phase coil, and a W-phase coil.

Ends of the U-phase power line, the V-phase power line, and the W-phase power line of the stator coil may be respectively connected to the U-phase coil, the V-phase coil, and the W-phase coil, and the other ends thereof may be respectively connected to the inverter, thereby allowing the U-phase power line, the V-phase coil, and the W-phase coil to receive three-phase AC power from the inverter.

The stator coil may include a plurality of layers spaced apart inside the slot along a radial direction of the stator core.

The plurality of phase power lines may be connected to a conductor segment disposed at an outermost layer along a radial direction of the stator core, among the plurality of layers of the plurality of phase coils.

Here, a plurality of conductor segments may be conductively connected in series respectively to the conductor segments of an outermost layer to which the phase power lines are connected, and in this case, the voltage distribution ratio is higher at a layer closer to the conductor segments connected to the phase power lines, and the voltage distribution ratio is lower at a layer that is further from the conductor segments connected to the phase power lines.

In one embodiment of the present disclosure, since the second-type conductor segment has the second sheath part, it has a relatively high insulation performance compared to the first-type conductor segment having only the first sheath part.

The second-type conductor segment having a relatively high insulation performance may be disposed in a section with a relatively high voltage distribution ratio compared to the first-type conductor segment having a relatively low insulation performance, thereby reducing a possibility of the occurrence of partial discharge in the conductor segment when a high voltage is applied thereto.

In one embodiment of the present disclosure, the second-type conductor segment is mainly disposed at an outer region within the slot along a radial direction of the stator core.

The first-type conductor segment is mainly disposed at an inner side of the second-type conductor segment along a radial direction of the stator core.

According to an embodiment of the present disclosure, the plurality of layers may include first to eighth layers, wherein the eighth layer is disposed at an outermost side inside the slot, and the second-type conductor segment is disposed in the eighth layer.

Accordingly, the possibility of partial discharge on the eighth layer, which has a high possibility of partial discharge due to a relatively high voltage distribution ratio, may be significantly reduced.

According to an embodiment of the present disclosure, the first sheath part may be formed to surround an entire length of the conductor segment, and the second sheath part may be formed to surround the crown part of the conductor segment.

Accordingly, the second sheath part may be formed on the crown part, thereby excluding a process of inserting an insulating member into a region of the crown part, which may require a relatively large amount of time and effort to insert the insulating member into the intersection region.

Accordingly, the process time of winding the stator coil may be remarkably reduced.

According to an embodiment of the present disclosure, an insulation distance between respective first sheath parts of conductor segments having different phases disposed at the outermost layer may be formed to be 400 $\mu$m or more.

Accordingly, the occurrence of partial discharge may be suppressed when a high voltage (800V) is applied to the stator coil.

According to an embodiment of the present disclosure, the crown part of the conductor segment disposed at the outermost layer may have a bending part protruding along an axial direction at the center and inclined sections connecting the bending part and respective ends of the two insertion parts, and the second sheath part may include a first section and a second section having different average thicknesses.

Accordingly, an amount of material required when forming the second sheath part may be reduced.

According to an embodiment of the present disclosure, a minimum thickness of the second sheath part of the second-type conductor segment disposed at the outermost layer may be formed to be 200 $\mu$m or more.

Here, the second sheath part may be formed by impregnating the bending part of a second-type conductor segment into a solution forming the second sheath part while the conductor segment is oriented such that the bending part is positioned at the bottom.

Here, the second sheath part is formed at a position higher than a boundary region between the two insertion parts and the two inclined sections of the second-type conductor segment while a bending part of the second-type conductor segment is inserted into the solution.

According to an embodiment of the present disclosure, the first sheath part may be formed of enamel and the second sheath part may be formed of epoxy.

The second sheath part is formed by impregnating the first-type conductor segment including the conductor and the first sheath part into an impregnation bath containing the epoxy solution, and then curing (drying) the impregnated conductor segment in a drying chamber.

Specifically, the second-type conductor segment is formed by impregnating the first-type conductor segment in the epoxy solution, and then drying the impregnated conductor segment at 140° C. for about an hour while maintaining a state in which the conductor segment is oriented such that the second sheath part is disposed at a lower side.

The second sheath part has a relatively large thickness in the first section including the bending part at a relatively low position, and has a relatively small thickness in the second section at a relatively high region compared to the first section.

Accordingly, the first section including the bending part of the crown part in which a possibility of the occurrence of damage to the first sheath part of the second-type conductor segment is high may have a relatively large thickness, thereby preventing partial discharge from occurring in the crown part of the second-type conductor segment.

In addition, in order to increase a thickness of the second sheath part in a region of the bending part of the crown part of the second-type conductor segment, which has a relatively high possibility of occurrence of partial discharge, an additional impregnation process may be excluded.

Here, the second section having a relatively small thickness of the second sheath part is configured to have a thickness of 200 µm or more.

Accordingly, when a high voltage of 800V is applied to the stator coil, the occurrence of partial discharge may be remarkably suppressed.

According to an embodiment of the present disclosure, the plurality of phase coils may include a first coil part to an n-th coil part having a plurality of conductor segments connected in series.

The second-type conductor segment may be disposed in a preset first section from the conductor segment to which the phase power line is connected.

Accordingly, the insulation performance of the first section having a relatively high voltage distribution ratio may be improved, thereby suppressing the occurrence of partial discharge in the first section.

According to an embodiment of the present disclosure, the first section may include a first coil part having a voltage distribution ratio of 60% or more.

Accordingly, the insulation performance of the first coil part may be improved, thereby suppressing the occurrence of partial discharge in the first coil part.

According to an embodiment of the present disclosure, the first section may include a first coil part having a voltage distribution ratio of 60% or more and a second coil part having a voltage distribution ratio of 50% or more, which is connected in series to the first coil part.

Accordingly, the insulation performance of the first coil part and the second coil part may be respectively improved, thereby suppressing the occurrence of partial discharge in the first coil part and the second coil part, respectively.

According to an embodiment of the present disclosure, the stator coil may include coil ends respectively protruding from both ends of the stator core along an axial direction; and a molding part formed to surround the coil ends with an electrical insulating member.

Accordingly, a contact between a coil end of the stator coil and air may be suppressed, suppressing the occurrence of partial discharge at the coil end.

Here, the molding part may be vacuum-formed to allow air around the coil end to be discharged.

As a result, the insulation performance of the coil end may be further improved, and the occurrence of partial discharge may be further suppressed.

As described above, according to an embodiment of the present disclosure, a stator coil may be configured by conductively connecting a plurality of conductor segments, and each of the conductor segment may include a first-type conductor segment having a conductor and a first sheath part, and a second-type conductor segment having a second sheath part surrounding a part of an outer surface of the first sheath part, and the second-type conductor segment may be disposed in a section having a relatively high voltage distribution ratio, thereby suppressing the occurrence of partially discharge on the stator coil.

Furthermore, the use of a separate insulating member inserted into an intersection region of the conductor segments may be excluded, thereby quickly and easily performing a process of winding the stator coil.

In addition, a phase power line of the stator coil may be connected to the conductor segment disposed in an outermost layer inside the slot, and the second-type conductor segment may be provided on the outermost layer of the slot, thereby suppressing the occurrence of partial discharge on the outermost layer in the slot having a relatively high voltage distribution ratio.

Moreover, a first sheath part of the second-type conductor segment may be formed to surround an entire length of the conductor, and the second sheath part may be configured to surround and insulate an outer surface of the crown part of the second-type conductor segment, thereby excluding the use of an insulating member inserted between the crown parts that intersect with each other.

Besides, a phase-to-phase insulation distance of the first sheath part of the conductor segment disposed in the outermost layer inside the slot may be formed to be 400 µm or more, thereby suppressing the occurrence of partial discharge on the conductor segments disposed on the outermost layer when a high voltage (800V) is applied to the stator coil.

Furthermore, the second sheath part of the second-type conductor segment may have a first section and a second section having different average thicknesses, thereby reducing an amount of material required when forming the second sheath part.

In addition, the first section may be configured to include the bending part, and the first section may be configured to have a larger coating thickness compared to the second section, thereby suppressing the occurrence of partial discharge in a region of the bending part having a relatively high possibility of occurrence of partial discharge.

Moreover, the second sheath part may be formed by impregnating the bending part of the conductor segment disposed in the outermost layer into a solution forming the second sheath part while being disposed at a lower side, thereby naturally increasing a thickness of the region of the bending part having a relatively high possibility of occurrence of partial discharge so as to exclude an additional impregnation process for improving the insulation performance of the region of the bending part.

Besides, the stator coil may include a plurality of phase coils, each of the plurality of phase coils may include a first coil part to an n-th coil part each having a plurality of conductor segments connected in series, and the second-type conductor segment may be disposed in a preset first section from the conductor segment connected to the phase power, thereby suppressing the occurrence of partial discharge in a region having a relatively high voltage distribution ratio.

Furthermore, the first section may include a first coil part having a voltage distribution ratio of 60% or more, thereby suppressing the occurrence of partial discharge in the first coil part.

In addition, the first section may include a first coil part having a voltage distribution ratio of 60% or more and a second coil part having a voltage distribution ratio of 50% or more, which is connected in series to the first coil part, thereby suppressing the occurrence of partial discharge in the first coil part and the second coil part having a relatively high possibility of occurrence of partial discharge.

Moreover, the stator coil may include a molding part formed to surround the coil end with an electrical insulating member, thereby improving the electrical insulation performance of the coil end when a high voltage of 800V is applied thereto, and suppressing the occurrence of partial discharge at the coil end.

Besides, the molding part may be vacuum-molded, thereby further improving the electrical insulation performance of the coil end when a high voltage of 800V is applied thereto, and more effectively suppressing the occurrence of partial discharge at the coil end.

BRIEF DESCRIPTION OF DRAWINGS

FIG. 5 is a front view showing the stator of FIG. 2.

DETAILED DESCRIPTION

Figure 1:
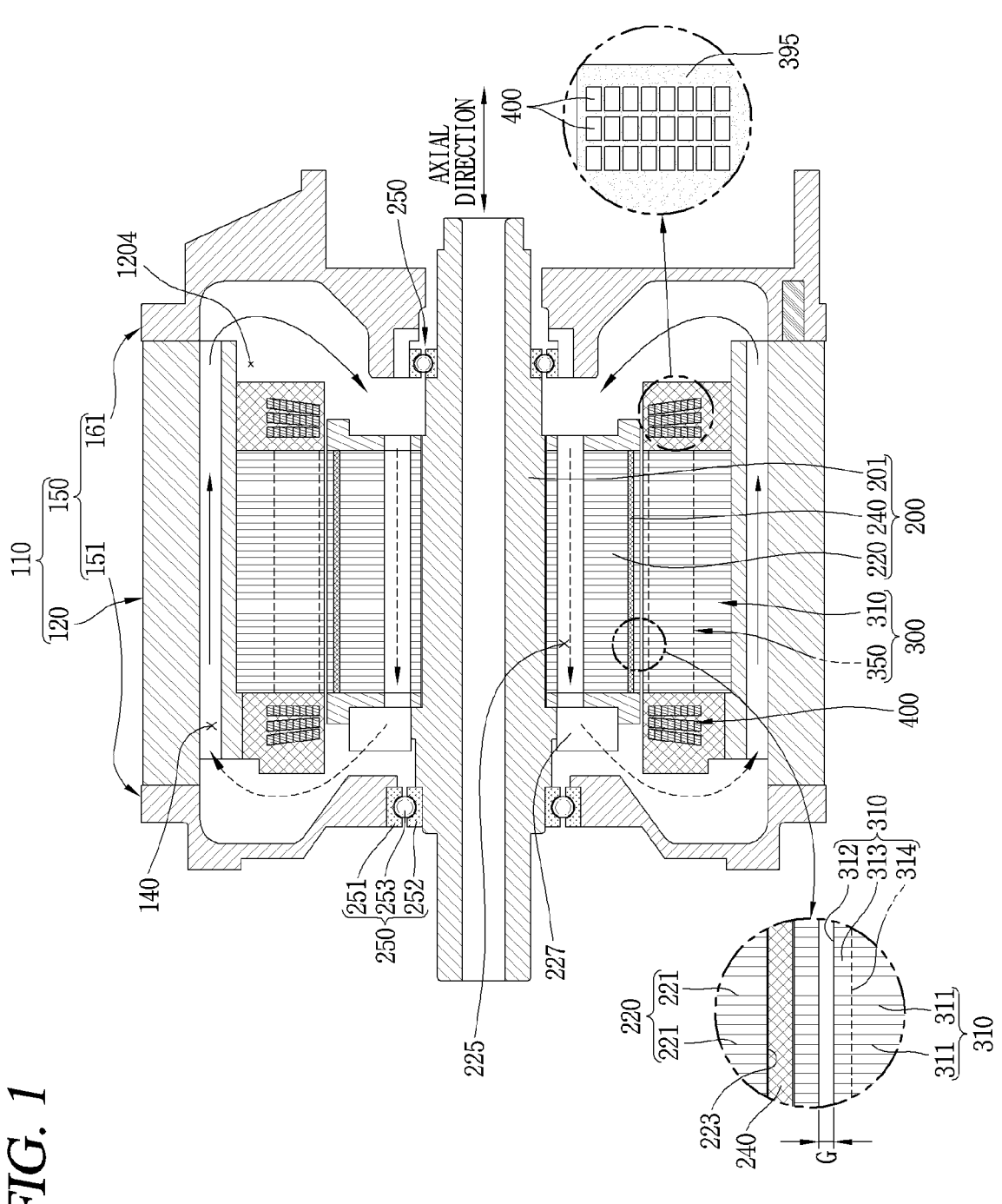
FIG. 1 is a cross-sectional view showing a state of use of a stator of a rotating electric machine according to an embodiment of the present disclosure.

Hereinafter, embodiments of the present disclosure will be described in detail with reference to the accompanying drawings. For the sake of brief description with reference to the drawings, the same or equivalent components will be provided with the same reference numerals, and description thereof will not be repeated. A singular representation used herein may include a plural representation unless it represents a definitely different meaning from the context. In describing the present disclosure, if a detailed explanation for a related known function or construction is considered to unnecessarily divert from the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

FIG. 1 is a cross-sectional view showing a stator of a rotating electric machine according to an embodiment of the present disclosure. As shown in FIG. 1, a stator 300 of the rotating electric machine of the present embodiment includes a stator core 310 and a stator coil 350.

The rotor 200 is rotatably accommodated inside the stator 300.

A housing 110 is provided outside the stator 300.

In the present embodiment, the rotating electric machine is configured to include the housing 110, the rotor 200 and the stator 300.

In the present embodiment, the rotating electric machine may be installed in a vehicle and used as a power source for providing power for driving the vehicle, or may be used as an auxiliary power source for assisting an engine for providing power.

The rotating electric machine may be disposed along a front-and-rear direction of the vehicle, for example.

The housing 100 is provided with an accommodation space 1204 thereinside.

Specifically, the housing 110 includes, for example, a housing body 120 in which the accommodation space 1204 is formed and a cover 150 coupled to both ends of the housing body 120.

The housing 110, for example, may be disposed along the front-rear direction.

For example, as depicted in FIG. 1, a top end of the housing 110 (sometimes referred to herein as a "front" or "front end") may be a positioned toward a front and a bottom end thereof (sometimes referred to herein as a "rear" or "rear end") may be positioned toward a rear.

The cover 150 includes, for example, a front cover 151 coupled to the front end of the housing body 120 and a rear cover 161 coupled to the rear end of the housing body 120.

Inside the stator 300, the rotor 200 is rotatably accommodated with a predetermined air gap (G).

The rotor 200 includes, for example, a rotating shaft 201, a rotor core 220 coupled to the rotating shaft 201, and a permanent magnet 240 coupled to the rotor core 220.

The rotating shaft 201 is configured to have a long length so as to protrude from both sides of the rotor core 220, for example.

The rotating shaft 201 is provided with bearings 250 along an rotational direction. As a result, the rotating shaft 201 can be rotatably supported.

The bearing 250, for example, may be configured to be accommodated in and coupled to the front cover 151 and the rear cover 161, respectively.

The bearing 250 may be implemented, for example, as a ball bearing including an outer ring 251, an inner ring 252 disposed concentrically with the outer ring 251, and a plurality of balls 253 disposed between the outer ring 251 and the inner ring 252.

The rotor core 220 is configured, for example, by insulating and stacking electrical steel sheets 221.

The rotor core 220 includes, for example, a permanent magnet insertion part 223 to allow the permanent magnet 240 to be inserted therein along an axial direction.

The permanent magnet insertion part 223 is disposed to pass through the rotor core 220 along an axial direction.

In the present embodiment, the axial direction refers to a direction parallel to the rotating shaft 201.

The rotor core 220 may include, for example, a plurality of through holes 225 passing therethrough along an axial direction.

Accordingly, air may move through the through hole 225 from one side of the rotor core 220 to the other side thereof along an axial direction.

The rotor core 220 may include, for example, a plurality of blades 227 that facilitate movement of air during the rotation of the rotor 200. The plurality of blades 227 may protrude along an axial direction with respect to an end of the rotor core 220 to be spaced apart along a circumferential direction.

Accordingly, during the rotation of the rotor 200, air may be moved from one side of the rotor 200 to the other side thereof through the plurality of through holes 225. As a result, the air inside the housing 110 may be cooled while being circulated.

The housing 110 may be provided with an air passage 140 passing therethrough along an axial direction. Accordingly, air circulation inside the housing 110 may be facilitated during the rotation of the rotor 200.

Although not specifically shown in the drawing, the housing 110 may include a coolant passage through which coolant circulates. Accordingly, air moving along the housing 110 and the air passage 140 may be respectively cooled.

Figure 2:
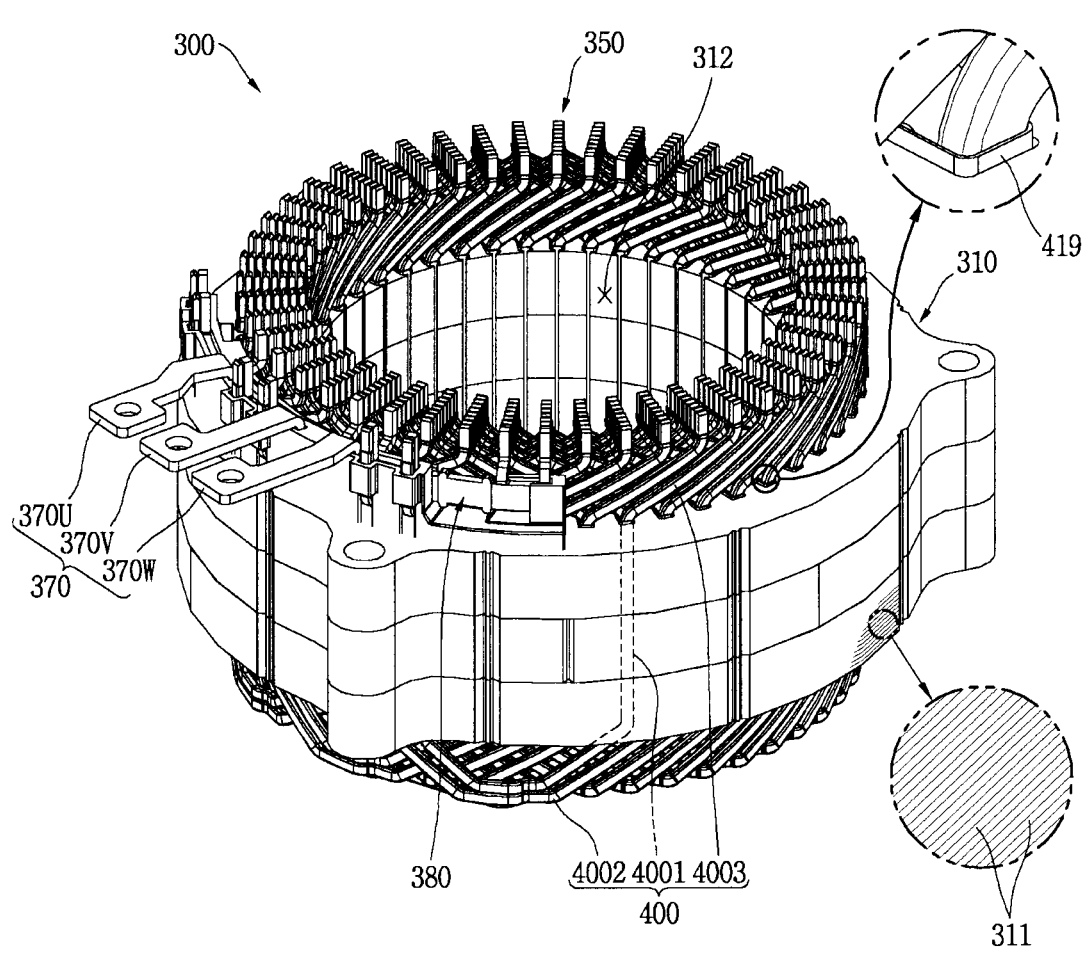
FIG. 2 is a perspective view showing the stator of FIG. 1.
Figure 3:
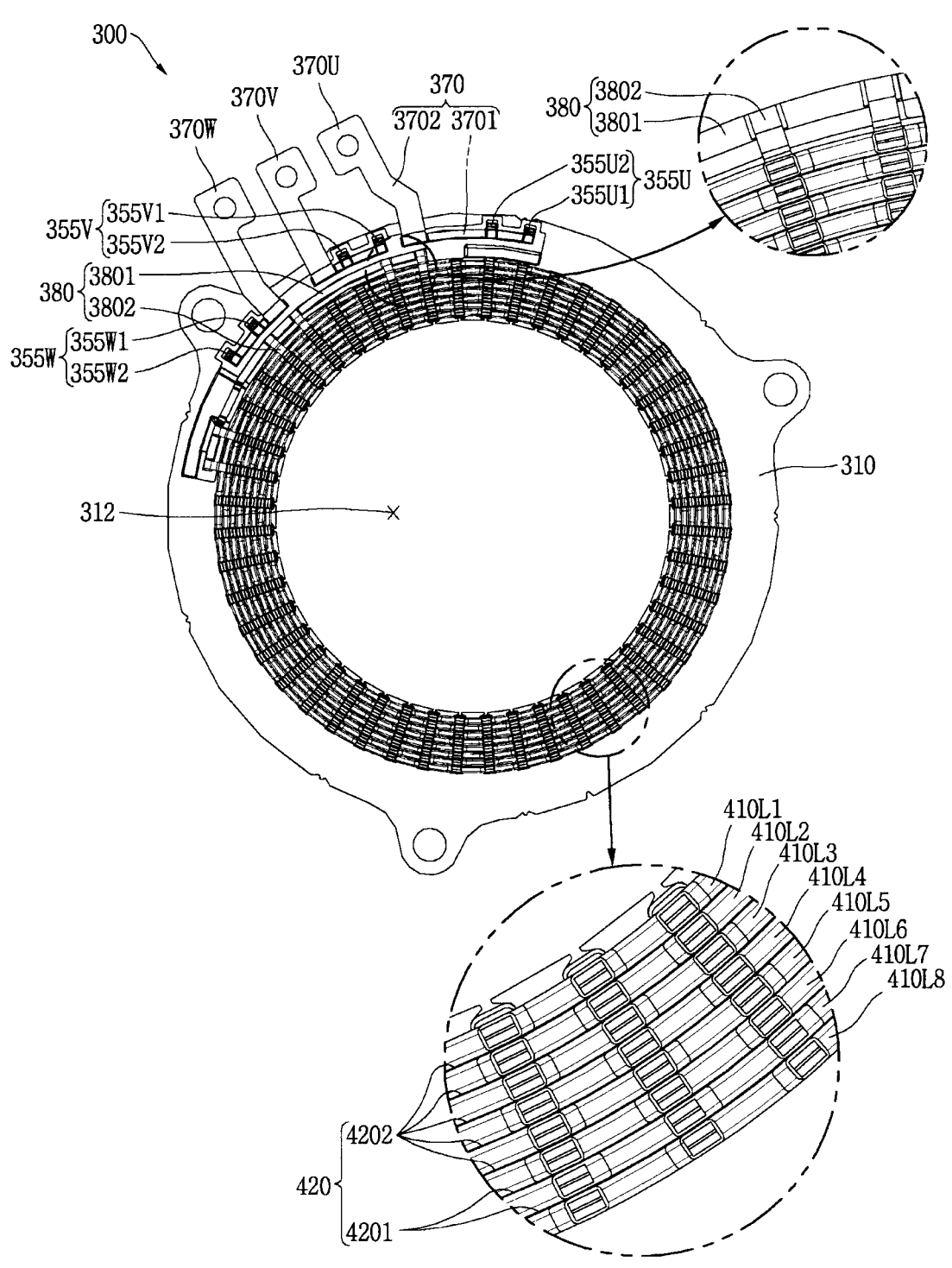
FIG. 3 is a plan view showing the stator of FIG. 2.
Figure 4:
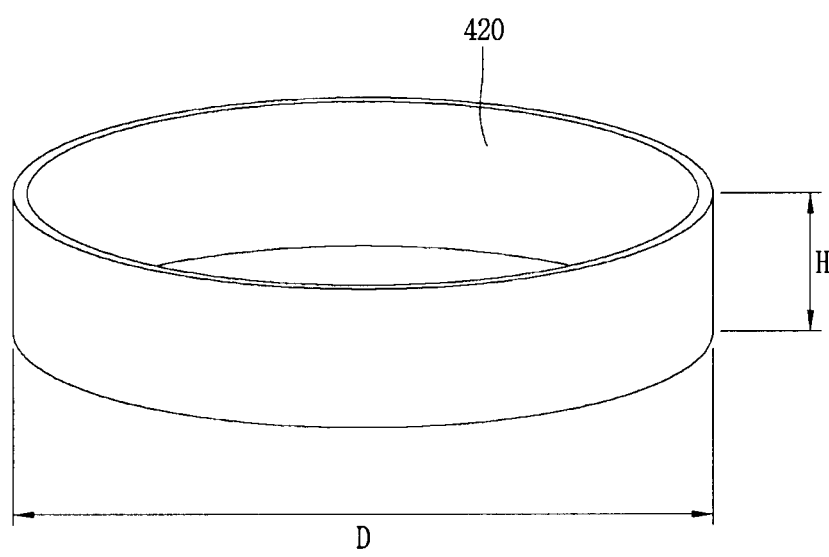
FIG. 4 is a perspective view showing a ring insulation paper according to an embodiment of the present disclosure.
Figure 5:
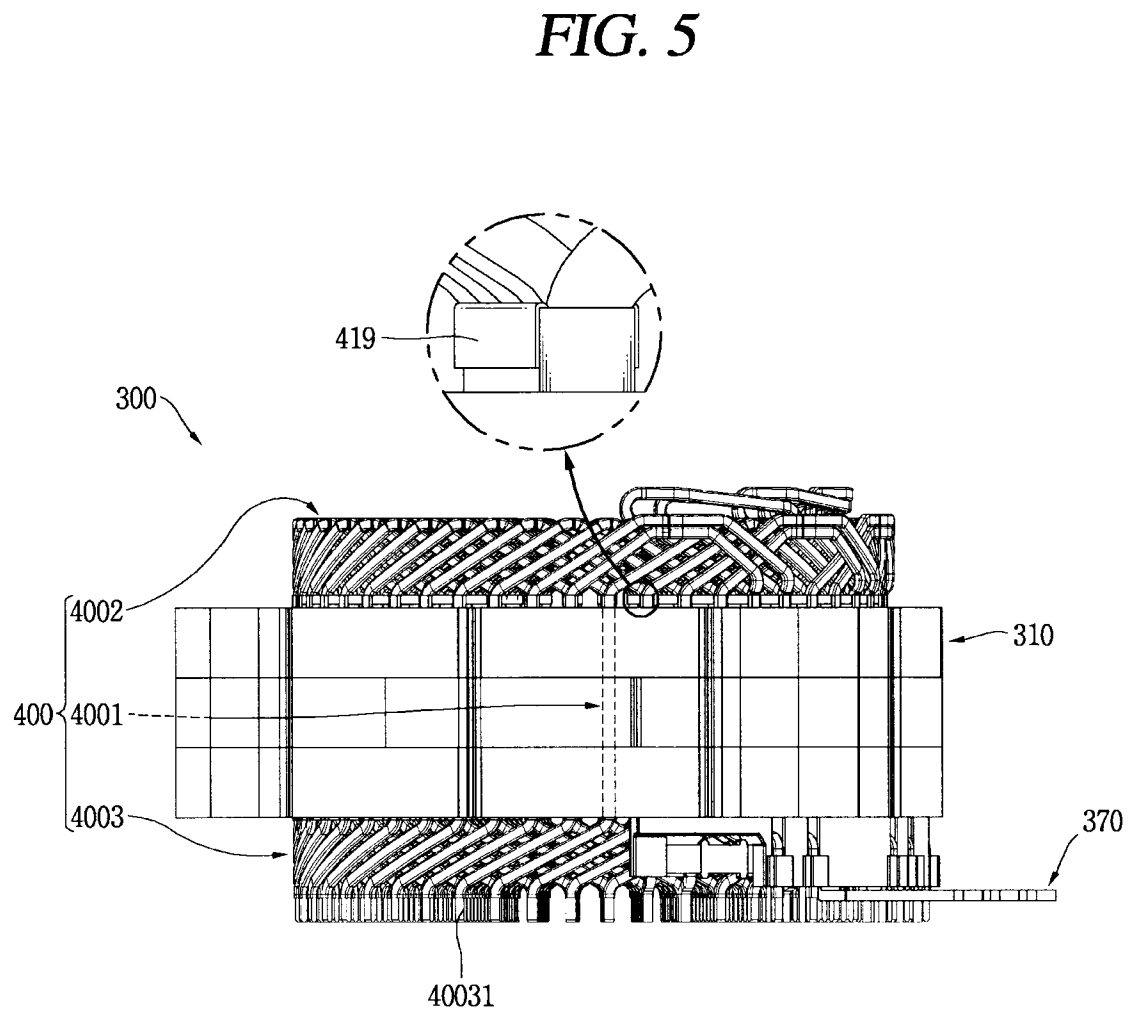
Figure 6:
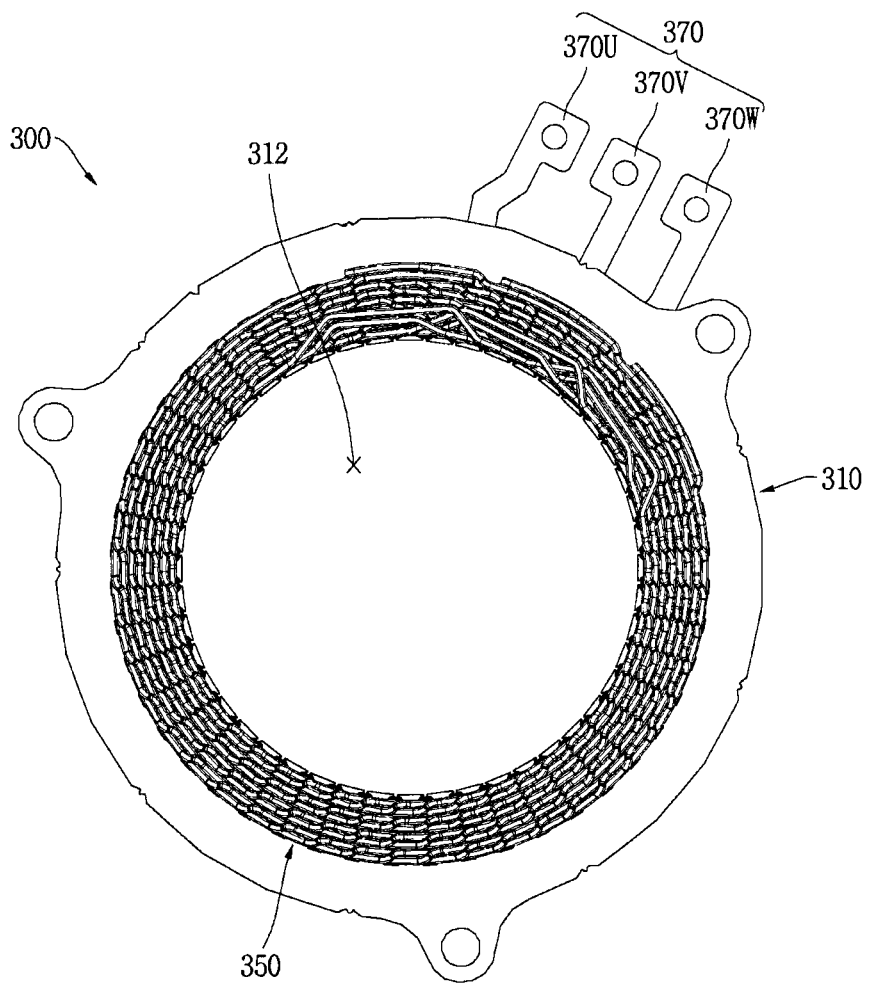
FIG. 6 is a bottom view showing the stator of FIG. 2.

FIG. 2 is a perspective view showing the stator of FIG. 1, FIG. 3 is a plan view showing the stator of FIG. 2, FIG. 4 is a perspective view showing a ring insulation paper of FIG. 3, FIG. 5 is a front view showing the stator of FIG. 2, and FIG. 6 is a bottom view showing the stator of FIG. 2.

As shown in FIGS. 2 to 6, the stator 300 of the rotating electric machine of the present embodiment includes the stator core 310 and the stator coil 350.

The stator core 310 is configured by, for example, insulating and stacking a plurality of electrical steel sheets 311 along an axial direction.

A rotor accommodating hole 312 in which the rotor 200 is rotatably accommodated is provided inside the stator core 310. The rotor accommodating hole 312 is configured to pass through the stator core 310 along an axial direction.

The stator core 310 includes a plurality of teeth 313 and slots 314. The plurality of slots 314 and teeth 313 are alternately disposed on a circumference of the rotor accommodating hole 312 along a circumferential direction.

Meanwhile, the stator coil 350, for example, is configured by conductively connecting a plurality of conductor segments 400 inserted into the plurality of slots 314.

Here, an insulating paper 419 for insulating the conductor segment 400 (an insertion part 4001 to be described later) and the stator core 310 is respectively inserted into each slot 314 of the stator core 310.

Each of the plurality of conductor segments 400 includes, for example, two insertion parts 4001 inserted into the slot 314, a crown part 4002 connecting the respective ends of the two insertion parts 4001, and a welding part 4003 extending from the respective other ends of the two insertion parts 4001 to be conductively connected by welding.

In each of the plurality of conductor segments 400, the two insertion parts 4001 are respectively inserted into and respectively coupled to the corresponding slots 314 to protrude to the other side of the stator core 310 at one side along an axial direction of the stator core 310.

The crown part 4002 protrudes from one end of the stator core 310 along the axial direction, and the welding part 4003 is formed by bending an end protruding from the other end of the stator core 310 in one direction (clockwise direction) or the other direction (counterclockwise direction) along a circumferential direction of the stator core 310.

In the present embodiment, the stator coil 350 is configured to be connected to, for example, a three-phase AC power source.

The stator coil 350 includes a plurality of phase coils 355 connected to a three-phase AC power source.

The plurality of phase coils 355 include a U-phase coil 355U, a V-phase coil 355V, and a W-phase coil 355W.

The plurality of phase coils 355 include two phase coils 355 connected in parallel to each other.

Specifically, the U-phase coil 355U includes a first U-phase coil 355U1 and a second U-phase coil 355U2 connected in parallel to each other.

The V-phase coil 355V includes a first V-phase coil 355V1 and a second V-phase coil 355V2 connected in parallel to each other.

The W-phase coil 355W includes a first W-phase coil 355W1 and a second W-phase coil 355W2 connected in parallel to each other.

A plurality of phase power lines 370 connected to the three-phase AC power source are connected to the plurality of phase coils 355, respectively.

Each of the plurality of phase power lines 370 includes a conductor connection part 3701 connected to the conductor segments 400, respectively, and a terminal 3702 having one end connected to the conductor connection part 3701 and the other end connected to the three-phase AC power source.

The plurality of phase power lines 370 include, for example, a U-phase power line 370U connected to the U-phase coil 355U, a V-phase power line 370V connected to the V-phase coil 355V, and a W-phase power line 370W connected to the W-phase coil 355W.

Specifically, the first U-phase coil 355U1 and the second U-phase coil 355U2 are respectively connected to the U-phase power line 370U.

The first V-phase coil 355V1 and the second V-phase coil 355V2 are respectively connected to the V-phase power line 370V.

The first W-phase coil 355W1 and the second W-phase coil 355W2 are respectively connected to the W-phase power line 370W.

In the present embodiment, the plurality of phase power lines 370 are electrically connected respectively to an outermost side of the welding part 4003 extending from the insertion part 4001 disposed in the slot 314 of the stator core 310.

In the present embodiment, the stator coil 350 includes a plurality of conductor segments 400. The plurality of conductor segments 400 may be conductively connected.

Meanwhile, in the present embodiment, the plurality of conductor segments 400 are configured to include first-type conductor segments 400a and second-type conductor segments 400b.

The first-type conductor segment 400a includes, for example, a conductor 401 and a first sheath part 402 surrounding and insulating an outer surface of the conductor 401.

The second-type conductor segment 400b includes, for example, the conductor 401, the first sheath part 402, and a second sheath part 403 surrounding and insulating a part (crown part 4002) of an outer surface of the first sheath part 402.

In the present embodiment, the first sheath part 402 may be formed of enamel, and the second sheath part 403 may be formed of epoxy.

As shown in FIG. 3, the conductor segment 400 constitutes a plurality of layers 410L spaced apart along a radial direction inside the slot 314 of the stator 300.

In the plurality of layers 410L, a first layer 410L1 is disposed at an innermost side of the slot 314 along a radial direction of the stator 300, and a second layer 410L2, a third layer 410L3, a fourth layer 410L4, a fifth layer 410L5, a sixth layer 410L6, a seventh layer 410L7, and an eighth layer 410L8 are sequentially and concentrically disposed along the radial direction.

The stator 300 includes a ring insulating paper 420 inserted between the each layer 410L to insulate between each of the the plurality of layers 410.

As illustrated in FIG. 4, the ring insulating paper 420 has a cylindrical shape having a preset height (H) and diameter (D).

As shown in FIG. 3, the ring insulation papers 420 are respectively inserted and coupled between the individual layers 410L of the welding parts 4003 of the conductor segment 400.

The ring insulating paper 420 includes, for example, a first ring insulating paper 4201 and a second ring insulating paper 4202 each made of electrical insulating members having different thicknesses.

The first ring insulating paper 4201 is implemented with a thickness of, for example, 0.21 mm or more.

The second ring insulating paper 4202 is configured to have a thickness of 0.35 mm or more.

As a result, the second ring insulating paper 4202 has superior electrical insulation performance compared to the first ring insulating paper 4201.

Here, the first ring insulating paper 4201 and the second ring insulating paper 4202 are respectively configured with different diameters D to have diameters corresponding to the corresponding layers 410L of the stator core 310.

In the present embodiment, the first ring insulating papers 4202 are respectively inserted between two radially adjacent layers of the first layer 410L1 to the sixth layer 410L6, and the second ring insulating papers 4201 are respectively inserted and coupled between two radially adjacent layers of the sixth layer 410L6 to the eighth layer 410L8.

Accordingly, the occurrence of partial discharge in the intersection region of the conductor segment 400 of the each layer 410L may be suppressed.

Figure 7:
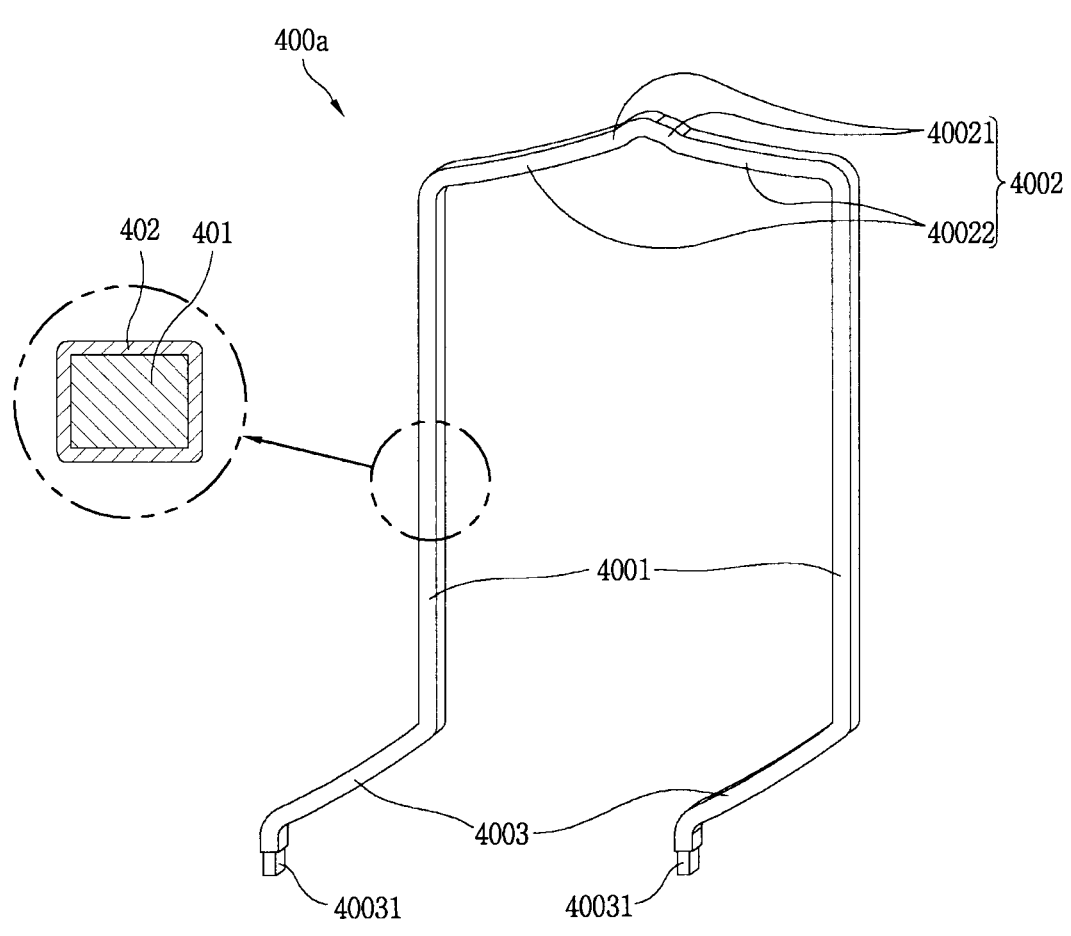
FIG. 7 is a perspective view showing a first-type conductor segment according to an embodiment of the present disclosure.
Figure 8:
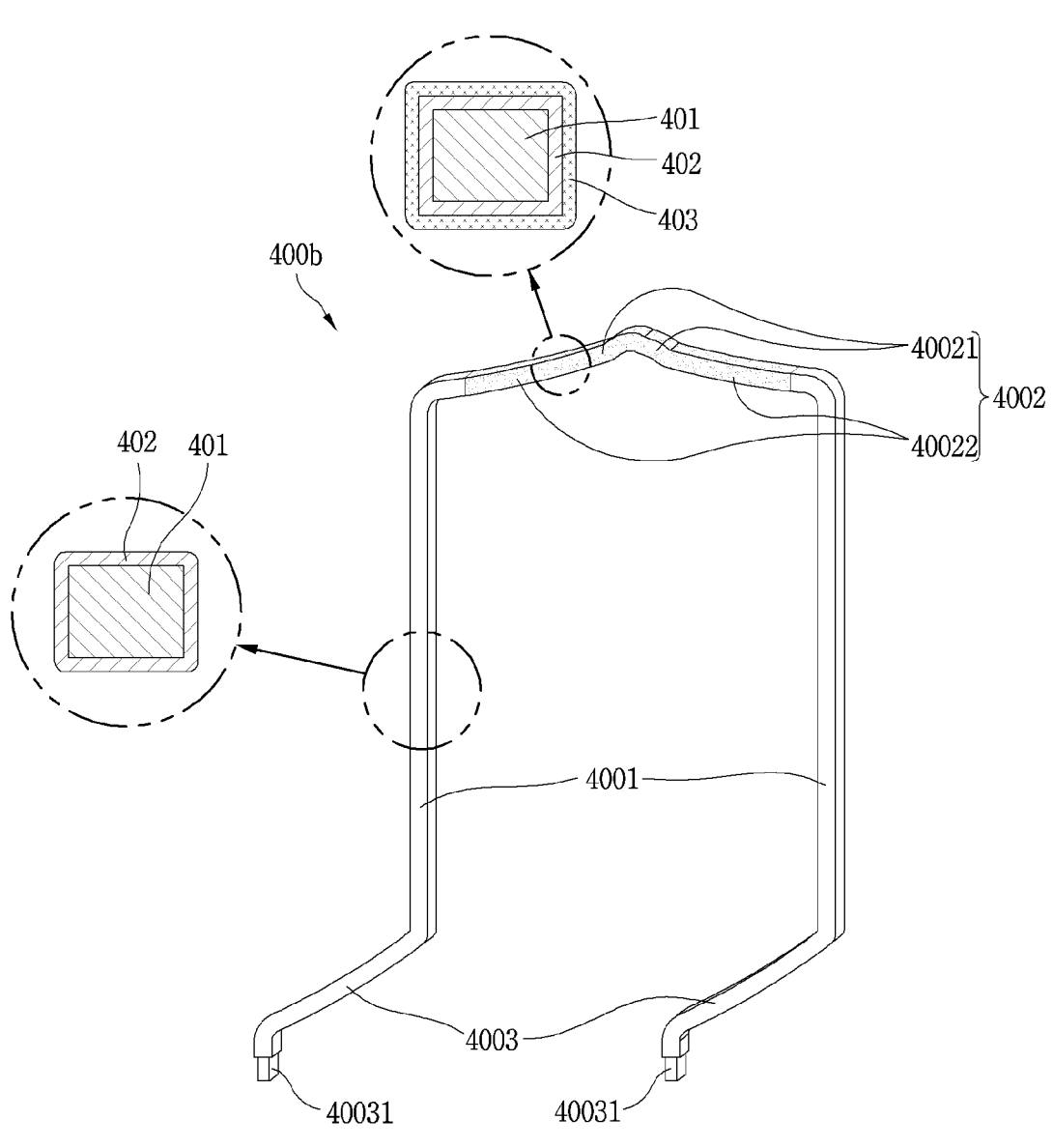
FIG. 8 is a perspective view showing a second-type conductor segment according to an embodiment of the present disclosure.
Figure 9:
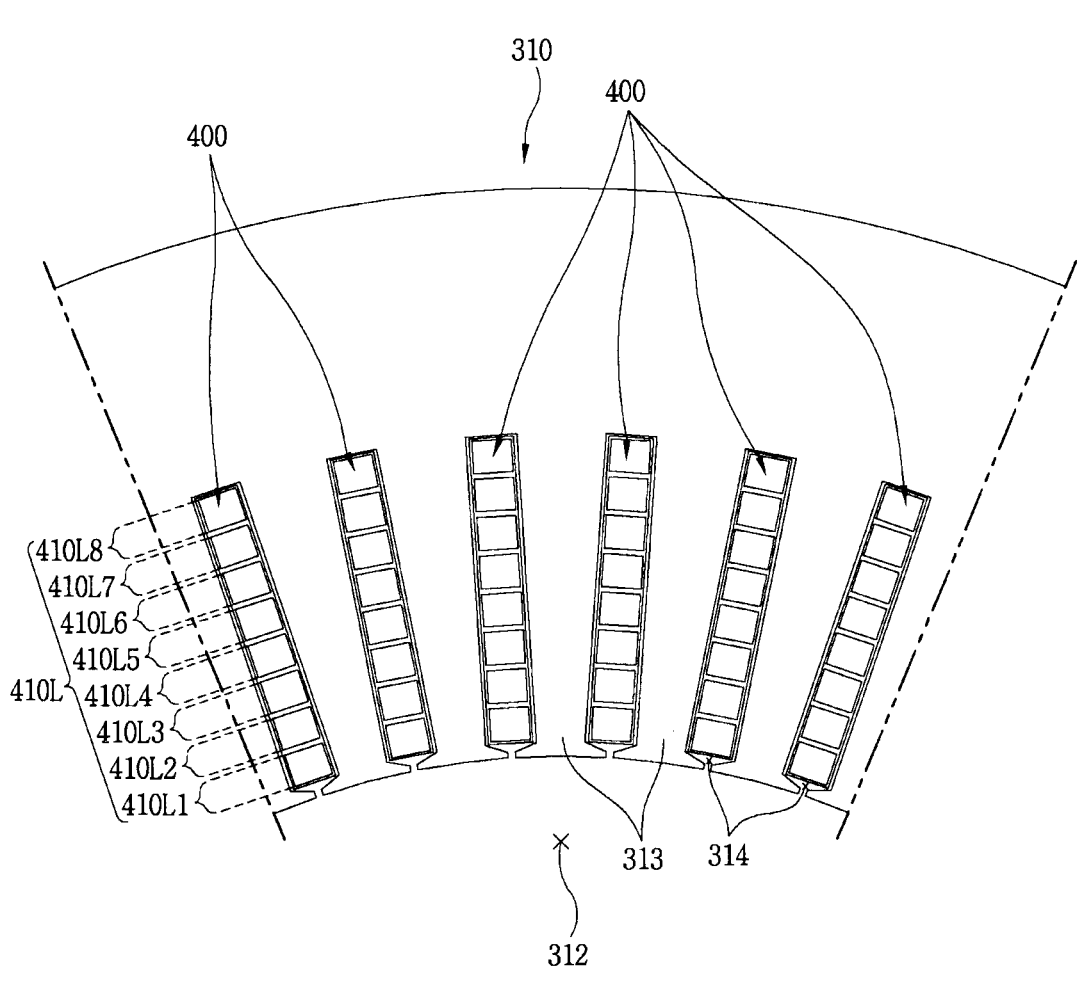
FIG. 9 is an enlarged view showing an inside of a slot according to an embodiment of the present disclosure.
Figure 10:
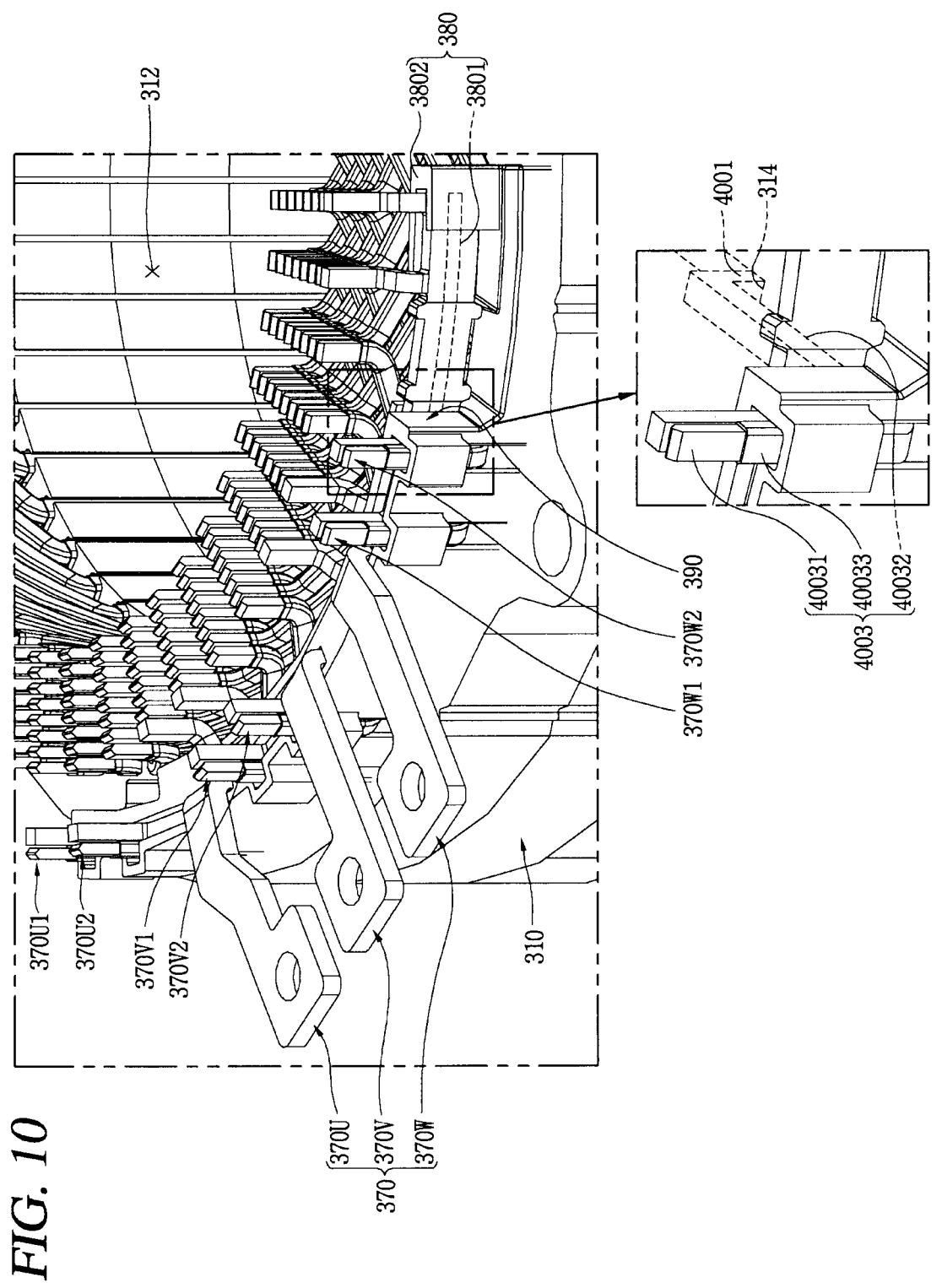
FIG. 10 is an enlarged view showing a phase power line region according to an embodiment of the present disclosure.

FIG. 7 is a perspective view showing a first-type conductor segment of FIG. 2, FIG. 8 is a perspective view showing a second-type conductor segment of FIG. 2, FIG. 9 is an enlarged view showing an inside of a slot of FIG. 3, and FIG. 10 is an enlarged view showing a phase power line region of FIG. 1.

As shown in FIG. 7, the plurality of conductor segments 400 include, for example, a first-type conductor segment 400a having a conductor 401 and a first sheath part 402 configured with an electrical insulating member to surround and insulate the conductor 401.

The first-type conductor segment 400a includes, for example, two insertion parts 4001, a crown part 4002 connecting respective ends of the two insertion parts 4001, and a welding part 4003 extending from the respective other ends of the two insertion parts 4001 to be conductively connected by welding.

The welding part 4003 of the first-type conductor segment 400a includes a connection end 40031 from which the first sheath part 402 is removed. The connection end 40031 of the first-type conductor segment 400a extends along an axial direction. A connection end 40031 of the first-type conductor segment 400a is disposed parallel to the connection end 40031 of another first-type conductor segment 400a, and then they are conductively connected (in series) to each other by welding.

As shown in FIG. 8, for example, the plurality of conductor segments 400 include a second-type conductor segment 400b having a conductor 401, a first sheath part 402 configured with an electrical insulating member to surround and insulate the conductor 401, and a second sheath part 403 configured with an electrical insulating member to surround and insulate a part (crown part 4002) of an outer surface of the first sheath part 402. In some embodiments, the second sheath part 403 may be formed at the crown part 40020, and the conductor 4001 and the welding part 4003 may not include the second sheath part 403.

The second-type conductor segment 400b includes, for example, two insertion parts 4001, a crown part 4002 connecting respective ends of the two insertion parts 4001, and a welding part 4003 extending from the respective other ends of the two insertion parts 4001 to be conductively connected by welding.

Here, the welding part 4003 may be bent at a slot pitch interval corresponding to about half of a slot pitch interval of the two insertion parts 4001 along one direction (clockwise direction) along a circumferential direction of the stator core 310, or may be bent at a slot pitch interval corresponding to about half of the slot pitch interval between the two insertion parts 4001 in the other direction (counterclockwise direction) along the circumferential direction of the stator core 310.

The welding part 4003 of the second-type conductor segment 400b includes a connection end 40031 from which the first sheath part 402 is removed. The connection end 40031 of the second-type conductor segment 400b extends along an axial direction. A connection end 40031 of the second-type conductor segment 400b is disposed parallel to the connection end 40031 of another second-type conductor segment 400b, and then they are conductively connected (in series) to each other by welding.

In the present embodiment, the first-type conductor segment 400a made by cutting and bending a long rectangular wire having the conductor 401 and the first sheath part 402 with a rectangular cross-section to have the two insertion parts 4001, the crown part 4002, and the welding parts 4003.

The second-type conductor segment 400b is configured by impregnating the crown part 4002 of the first-type conductor segment 400a into an impregnation bath 450 to be described later to form the second sheath part 403.

The two insertion parts 4001 of each conductor segment 400 are inserted into and coupled to different slots 314 at a preset slot pitch interval.

Specifically, when the slot pitch interval of the conductor segment 400 has a slot pitch interval of 8-slot pitches, one of the two insertion parts 4001 of the conductor segment 400 is inserted into a first slot, and the other one of the two insertion parts 4001 is inserted into a ninth slot, which is an eighth slot along a circumferential direction from the first slot.

In an embodiment, although not specifically shown in the drawing, the individual conductor segments 400 are configured to have multiple types of conductor segments 400 having different slot pitch intervals and sizes, respectively.

As shown in FIG. 9, two insertion parts 4001 of each conductor segment 400 are inserted into two corresponding slots 314 spaced apart along a radial, as well as rotational, or circumferential, direction.

In an embodiment, the stator coil 350 is configured by conductively connecting a plurality of conductor segments 400 inserted into the slots 314 to form a plurality of layers 410L.

Specifically, in the plurality of layers 410L, a first layer 410L1 is disposed at an innermost side inside the slot 314, and a second layer 410L2 to an eighth layer 410L8 are sequentially and concentrically disposed starting at an outer side of the first layer 410L1.

In an embodiment, the plurality of layers 410L of the stator coil 350 may be implemented to have eight layers, however this is only an example and the present disclosure is not limited thereto.

The plurality of layers 410L may be composed of any number of layers suitable for the stator coil, for example 6 or 4 layers.

In an embodiment, the eighth layer 410L8 may be referred to as an outermost layer 410L inside the slot 314.

In an embodiment, the first layer 410L1 may be referred to as an innermost layer 410L inside the slot 314.

In an embodiment, at a central region of the crown part 4002 of each conductor segment 400, a bending part 40021 may be formed by bending the two insertion parts 4001 to be respectively inserted into different layers 410L inside different slots 314 along a radial direction of the stator core 310.

In an embodiment, one of the two insertion parts 4001 of a first-type conductor segment 400a may be disposed in the eighth layer 410L8 inside the slot 314, and the other one of the two insertion parts 4001 may be disposed in the seventh layer 410L7 inside another slot 314, for example.

One of the two insertion parts 4001 of a second-type conductor segment 400b may be disposed in the seventh layer 410L7 inside the slot 314, and the other one of the two insertion parts 4001 may be disposed in the sixth layer 410L6 inside the slot 314, for example.

The conductor segment 400 may be inserted such that the number of inner layers inside the slot 314 of the stator core 310 decreases along one direction (e.g., clockwise direction) along a circumferential direction of the stator core 310, and may be inserted such that the number of inner layers of the slot 314 increases in the other direction (e.g., counterclockwise direction) along the circumferential direction of the stator core 310 when the insertion part 4001 of the conductor segment 400 reaches an innermost layer inside the slot 314.

The stator coil 350 includes, for example, a neutral line 380 having one end connected to the phase power lines 370 of the plurality of phase coils 355 and the other end connected to the plurality of phase coils 355.

Referring to FIGS. 2, 3, and 10 together, the plurality of phase power lines 370 is bent to extend in an outward direction of the slot 314 along a radial direction of the stator core 310. The welding part 4003 of the first conductor segment 400 of each phase coil 355 is connected to the corresponding phase power line 370.

For example, the first insertion part 4001 of a first conductor segment 400 to which the phase power line 370 is connected is disposed in the eighth layer 410L8 inside the slot 314. The first welding part 4003 of the first conductor segment 400, to which the phase power lines 370 is connected, includes a horizontal section 40032 extending outward along a radial direction from the insertion part 4001 and a vertical section 40033 bent from the horizontal section 40032 to extend along an axial direction.

The connection end 40031 to which the phase power line 370 is connected is made by removing (peeling) the first sheath part 402 at an end of the vertical section 40032.

The neutral line 380 is, for example, disposed at one side (an upper side in the drawing) along an axial direction of the stator core 310 of the horizontal section 40032 of the first conductor segment 400 to which the phase power line 370 is connected, and electrically connected to the last conductor segment 400 of each phase coil 355.

In an embodiment, a part of the phase power line 370 and the neutral line 380 may be respectively provided inside a connection ring 390 made of a synthetic resin member. The terminals 3702 of the individual phase power lines 370 are respectively disposed to protrude outward from the connection ring 390 along an axial direction of the stator core 310.

In an embodiment, the last conductor segments 400 of the individual phase coils 355 connected to the neutral line 380, which have a relatively low distribution ratio, are configured with the second-type conductor segments 400b due to being disposed adjacent to the nearby conductor segments 400 having a relatively high voltage distribution ratio.

Figure 11:
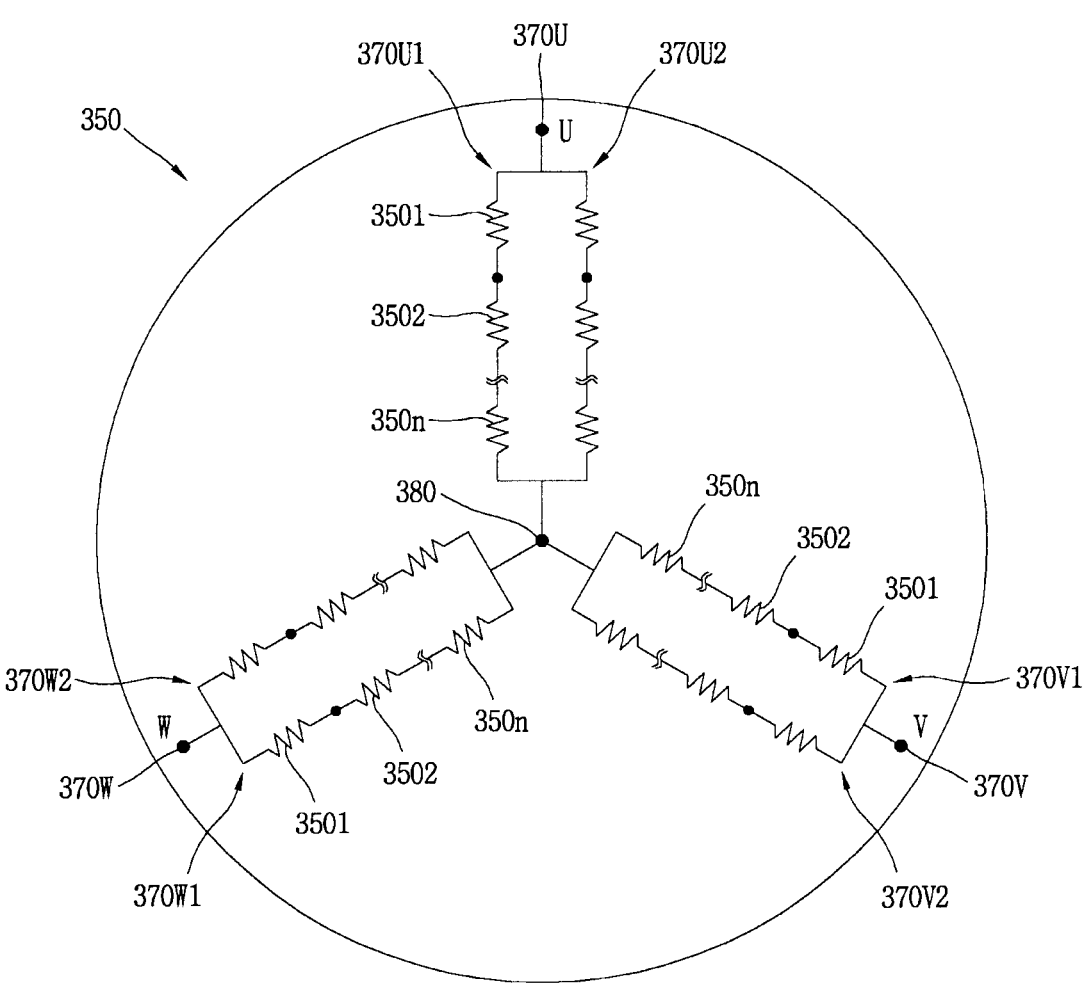
FIG. 11 is a wiring diagram showing a stator coil according to an embodiment of the present disclosure.
Figure 12:
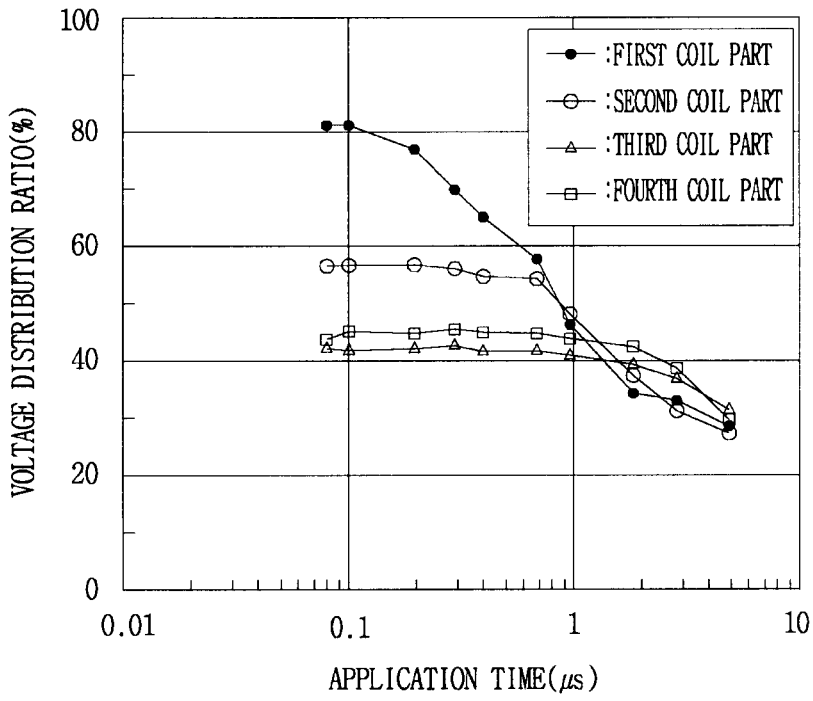
FIG. 12 is a diagram showing a voltage distribution ratio of each coil part according to an embodiment of the present disclosure.

FIG. 11 is a wiring diagram showing the stator coil of FIG. 1, and FIG. 12 is a diagram showing a voltage distribution ratio of each coil part of FIG. 11. As shown in FIG. 11, the stator coil 350 of the present embodiment is wound in a so-called Y-wiring method in which the last conductor segments 400 of the plurality of individual phase coils 355 are conductively connected at the same time.

Respective one ends (first conductor segments 400) of the first U-phase coil 355U1 and the second U-phase coil 355U2 are connected in parallel with each other to the U-phase power line 370U, respective one ends (first conductor segments 400) of the first V-phase coil 355V1 and the second V-phase coil 355V2 are connected in parallel with each other to the V-phase power line 370V, and respective one ends (first conductor segments 400) of the first W-phase coil 355W1 and the second W-phase coil 355W2 are connected in parallel with each other to the W-phase power line 370W.

The respective other ends (last conductor segments 400) of the first U-phase coil 355U1 and the second U-phase coil 355U2, the respective other ends (last conductor segments 400) of the first V-phase coil 355V1 and the second V-phase coil 355V2, and the respective other ends (last conductor segments 400) of the first W-phase coil 355W1 and the second W-phase coil 355W2 are connected to the neutral line 380 to be conductive to each other.

Meanwhile, the first U-phase coil 355U1 and the second U-phase coil 355U2, the first V-phase coil 355V1 and the second V-phase coil 355V2, and the first W-phase coil 355W1 and the second W-phase coil 355W2 are respectively configured to have a first coil part 3501 to an n-th coil part 350n each having a plurality of conductor segments 400 connected in series with one another.

The first coil part 3501 to the n-th coil part 350n of the each phase coil 355 are connected in series with one another.

Here, the first coil part 3501 of the each phase coil 355 includes a first conductor segment 400 connected to each phase power line 370, and the n-th coil part 350n includes the last conductor segment 400 connected to the neutral line 380.

In an embodiment, the first U-phase coil 355U1 and the second U-phase coil 355U2, the first V-phase coil 355V1 and the second V-phase coil 355V2, and the first W-phase coil 355W1 and the second W-phase coil 355W2 may respectively include a first coil part 3501, a second coil part 3502, a third coil part, and a fourth coil part connected in series to one another, and the first coil part 3501, the second coil part 3502, the third coil part (not shown), and the fourth coil part (not shown) may respectively include eight conductor segments 400 connected in series with one another.

Meanwhile, when a change in voltage over time is detected with an oscilloscope while power is applied to the plurality of phase coils 355, as shown in FIG. 12, a voltage distribution ratio of the first coil part 3501 connected to the phase power line 370 of each phase coil 355 is the highest at 60% or more, and a voltage distribution ratio of the second coil part 3502 connected in series to the first coil part 3501 is output at 50% or more and less than 60%. Voltage distribution ratios of the third coil part connected in series to the second coil part 3502 and the fourth coil part connected in series to the third coil part have a range of 40% or more and less than 50%.

Here, the voltage distribution ratio of each coil part means a maximum value (peak value), and the maximum value of the voltage distribution ratio is generated in a very short moment from the time when power is applied. As time elapses, the voltage distribution ratio of each coil part gradually converges to around 25%.

In the present embodiment, the stator coil 350 may be configured such that the second-type conductor segment 400b is provided in a preset first section from the first conductor segment 400 to which the phase power line 370 of each phase coil 355 is connected.

Here, the first section may be set based on a voltage distribution ratio of the each coil part, for example.

For an example, the first section may be set as a section in which the voltage distribution ratio is 60% or more.

In one embodiment of the present disclosure, the first coil part 3501 of the each phase coil 355 may include the second-type conductor segments 400b, and the second coil part 3502 to the n-th coil part 350n of each phase coil 355 may be implemented with the first-type conductor segments 400a.

In another embodiment of the present disclosure, the first section may be set as a section in which the voltage distribution ratio is 50% or more. The first coil part 3501 and the second coil part 3502 of the each phase coil 355 may be implemented as the second-type conductor segments 400b, and the third coil part to the n-th coil part 350n may be implemented with the first-type conductor segment 400a.

Figure 13:
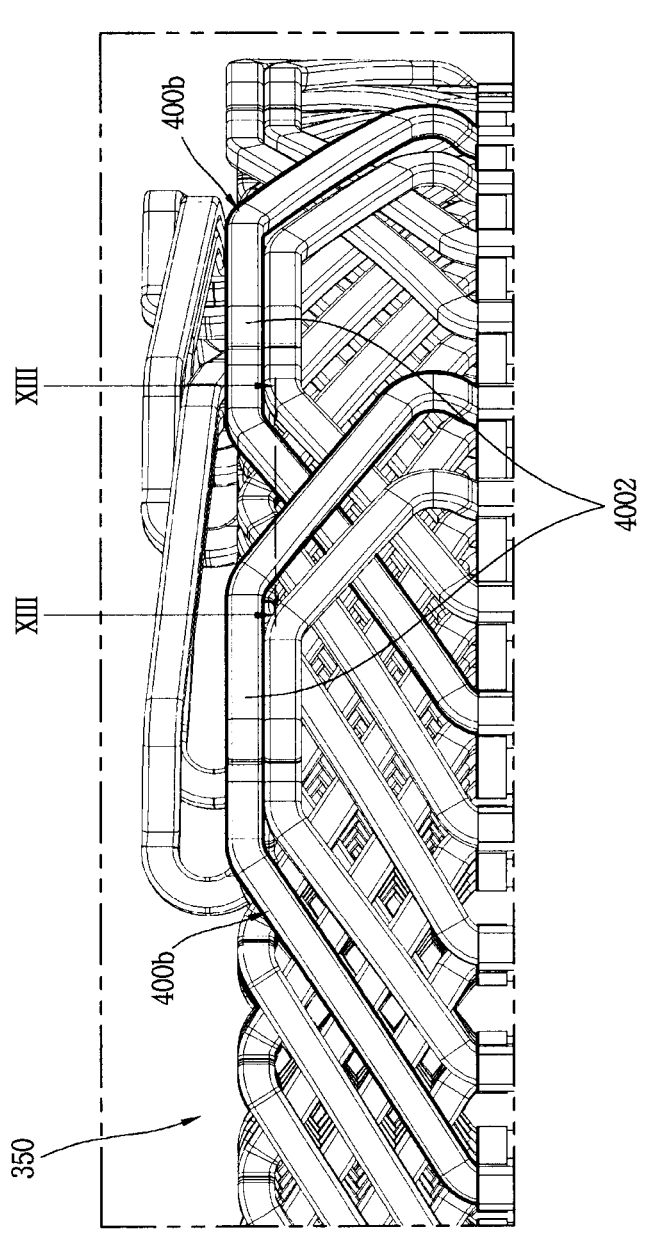
FIG. 13 is an enlarged view showing an intersection region of the second-type conductor segment according to an embodiment of the present disclosure.
Figure 14:
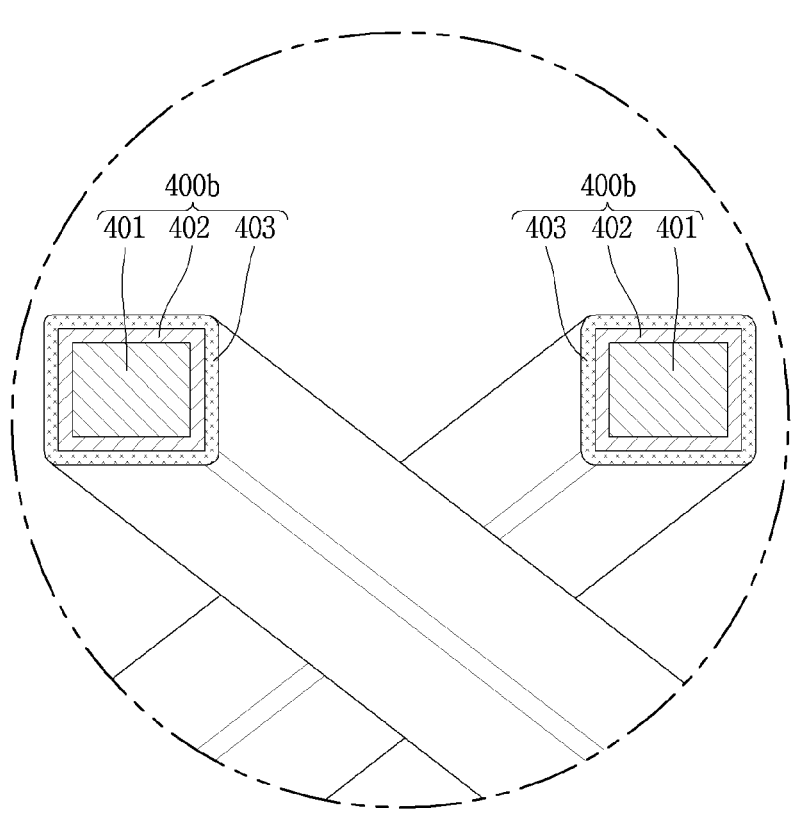
FIG. 14 is an enlarged cross-sectional view showing an intersection region of the second-type conductor segments according to an embodiment of the present disclosure.

FIG. 13 is an enlarged view showing an intersection region of the second-type conductor segment of FIG. 2, and FIG. 14 is an enlarged cross-sectional view showing an intersection region of the second-type conductor segments of FIG. 13.

As shown in FIGS. 13 and 14, the two insertion parts 4001 of each conductor segment 400 are disposed in different layers inside different slots 314. Specifically, when either one of the two insertion parts 4001 of the conductor segment 400 is disposed in the eighth layer 410L8 inside the slot 314, the other insertion part 4001 may be disposed in the seventh layer 410L7 inside another slot 314.

Therefore, conductor segments 400 adjacent to each other generate an intersection region, and when the conductor segments 400 of different phase coils 355 are replaced, a possibility of partial discharge due to a high voltage surge is relatively high.

In an embodiment, when a high voltage (800V) is applied to the stator coil 350, a phase-to-phase insulation distance of the first sheath part 402 in different conductor segments 400 is required to be 400 μm or more.

In the present embodiment, the second-type conductor segments 400b are respectively configured to have the second sheath part 403 surrounding and insulating a part of an outer surface of the first sheath part 402 surrounding and insulating an outer surface of the conductor 401, and a minimum thickness of the second sheath part 403 is configured to be 200 to 280 μm or more.

Accordingly, the phase-to-phase insulation distance (400 μm) of the first sheath part 402 of the second-type conductor segment 400b may be secured.

According to this configuration, the first section (the first coil part 3501 and/or the second coil part 3502) having a relatively high voltage distribution ratio may be implemented with the second-type conductor segment 400b having a high insulation performance, thereby significantly suppressing the occurrence of partial discharge due to an instantaneously increased voltage distribution ratio when power is applied to the stator coil 350.

Figure 15:
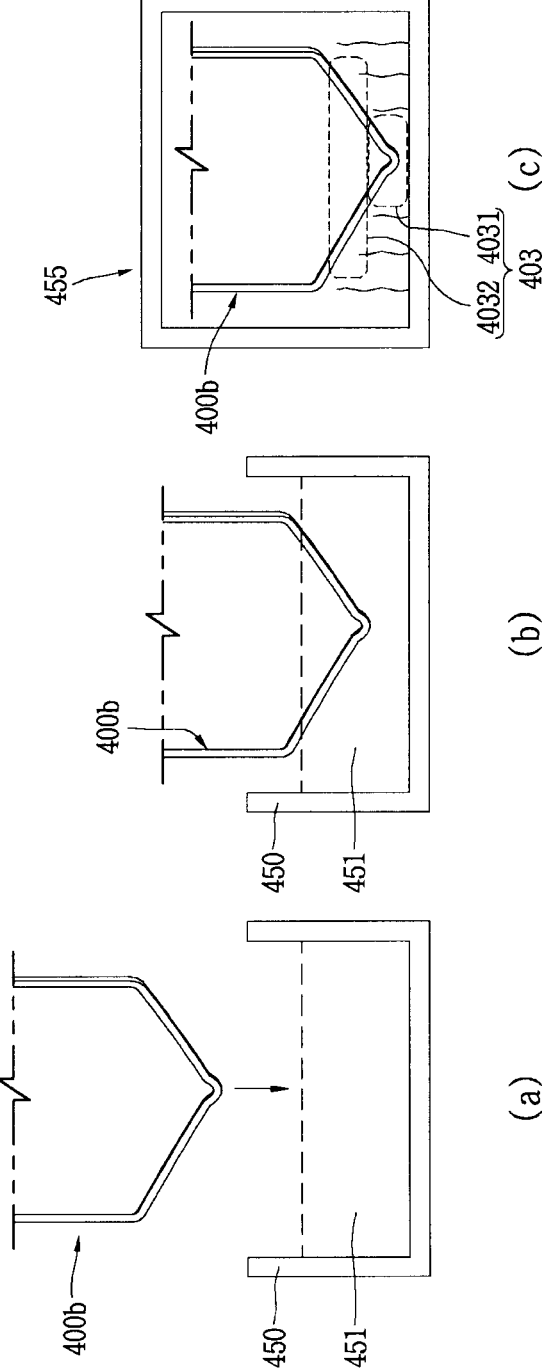
FIG. 15 is a view for explaining a manufacturing process of the second-type conductor segment according to an embodiment of the present disclosure.
Figure 16:
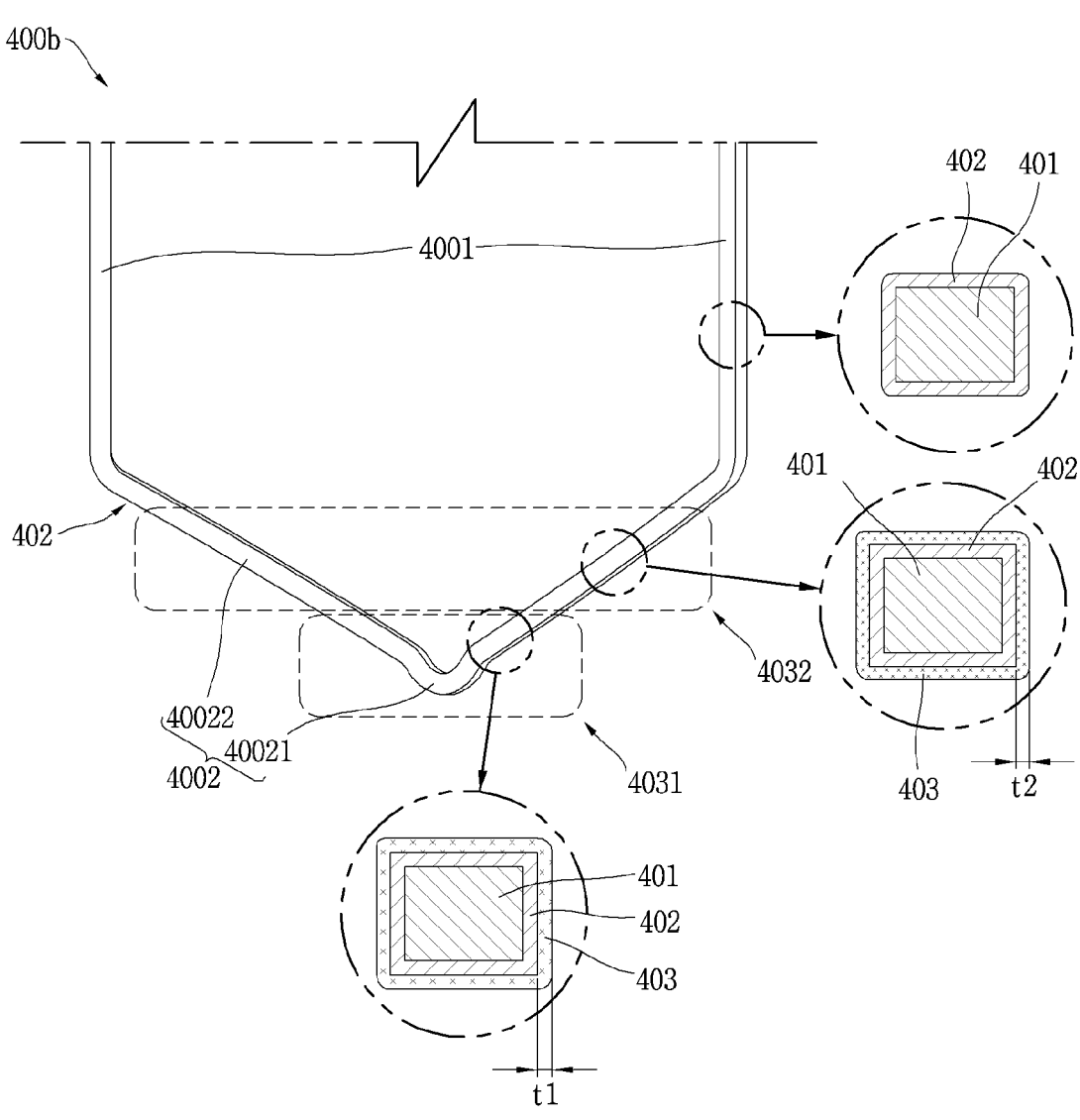
FIG. 16 is an enlarged view showing a main part of the second-type conductor segment according to an embodiment of the present disclosure.

FIG. 15 is a view for explaining a manufacturing process of the second-type conductor segment of FIG. 2, and FIG. 16 is an enlarged view showing a main part of the second-type conductor segment of FIG. 15.

As described above, the first sheath part 402 in the second-type conductor segment 400b of the present embodiment is formed of enamel, and the second sheath part 403 is formed of epoxy.

Specifically, as shown in (a) of FIG. 15, while the crown part 4002 of the second-type conductor segment 400b having the conductor 401 and the first sheath part 402 is disposed at a lower side, the second-type conductor segment 400b is disposed at an upper side of the impregnation bath 450 containing an epoxy solution 451 for forming the second sheath part 403.

Next, as shown in (b) of FIG. 15, the second-type conductor segment 400b is impregnated for a preset period of time such that the bending part 40021 and the inclined sections 40022 of the crown part 4002 of the second-type conductor segment 400b are immersed inside the epoxy solution 451.

Next, as shown in (c) of FIG. 15, the second-type conductor segment 400b separated from the impregnation bath 450 is dried (cured) inside a heating chamber 455 for a preset period of time. The heating chamber 455 is configured to have a heating means for heating thereinside, and the inside of the heating chamber 455 is configured to maintain a preset temperature for a preset period of time. Here, the second-type conductor segment 400b may be maintained at 455° C. for an hour inside the heating chamber, thereby curing the second sheath part 403.

As shown in FIG. 16, the second sheath part 403 of the second-type conductor segment 400b includes a first section 4031 and a second section 4032 having different thicknesses.

The first section 4021 includes the bending part 40021 disposed at a relatively lower side during the impregnation and drying process. The second section 4032 is formed in an upper region of the first section 4031 disposed at a relatively high position during the impregnation and drying process.

Here, the first section 4021 of the second sheath part 403 has a relatively large thickness compared to the second section 4032 since the epoxy solution 451 moves downward toward the bending part 40021 under the action of gravity during the process of impregnating and drying the second-type conductor segment 400b. In the present embodiment, a first thickness t1 of the first section 4031 is formed to have an average of 280 μm or more, and the second thickness t2 of the second section 4302 is formed to be 200 μm or more on average.

In the present embodiment, since the bending part 40021 of the crown part 4002 of the second-type conductor segment 400b is bent to have a relatively small radius of curvature, the first sheath part 402 of the bending part 40021 has a relatively high possibility of occurrence of damage, and due to this, a possibility of occurrence of partial discharge is relatively high when power is applied thereto.

In the present embodiment, a region of the bending part 40021 of the crown part 4002, in which a possibility of damage to and a possibility of occurrence of partial discharge in the first sheath part 402 are relatively high, may be configured to have a relatively large thickness, thereby significantly reducing the possibility of occurrence of partial discharge when power is applied to the stator coil 350.

Figure 17:
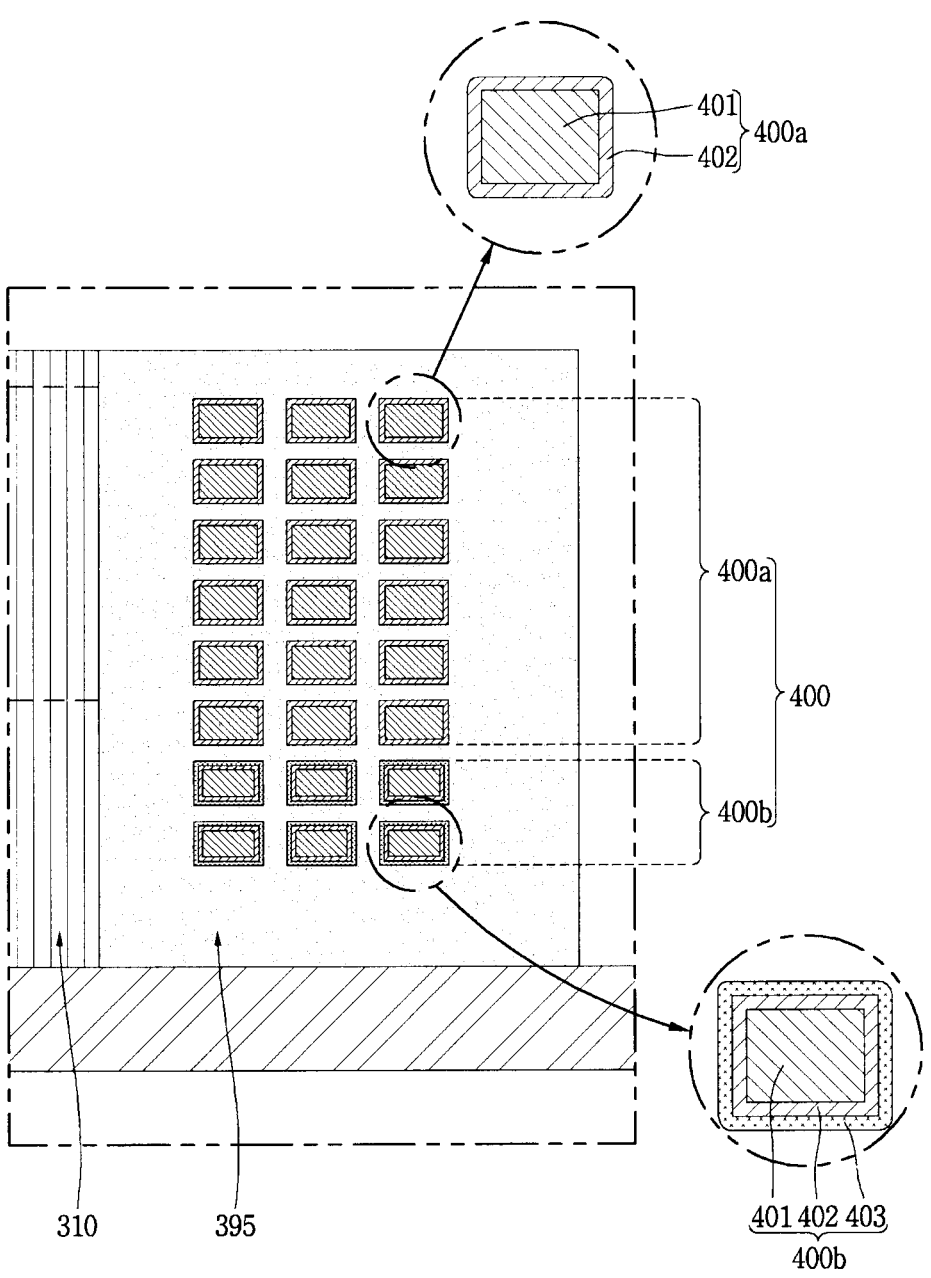
FIG. 17 is an enlarged view showing a main part of the stator according to an embodiment of the present disclosure.

FIG. 17 is an enlarged view showing a main part of the stator of FIG. 1. As shown in FIGS. 1 and 17, the stator coil 350 includes coil ends respectively protruding from both ends of the stator core 310 along an axial direction.

In the present embodiment, the stator 300 includes a molding part 395 formed by molding the coil end of the stator coil 350 to be surrounded by an electrical insulating member.

The molding part may be vacuum-formed, for example, to allow air inside the molding part, that is, inside and around the coil end to be discharged to an outside of the molding part.

According to this configuration, the air around the coil end may be significantly reduced, thereby significantly suppressing the occurrence of partial discharge in the coil end when power is applied to the stator coil 350.

The foregoing description has been given of specific implementations of the present disclosure. However, since the present disclosure can be embodied in various forms without departing from the essential characteristics, the implementations described above should not be limited by the specific contents for carrying out the invention.

In addition, even implementations not listed in the foregoing detailed description should be broadly construed within the scope of the technical idea defined in the appended claims. Further, all changes and modifications included within the technical range of the claims and their equivalents should be embraced by the appended claims.

The invention claimed is:

1. A stator of a rotating electric machine, the stator comprising:
a stator core having a plurality of slots; and
a stator coil configured by connecting a plurality of conductor segments comprising:
one or more first-type conductor segments each having a conductor and a first sheath part surrounding and insulating an outer surface of the conductor; and
one or more second-type conductor segments each having a conductor, a first sheath part, and a second sheath part surrounding and insulating a part of an outer surface of the first sheath part,
wherein each of the conductor segments comprises:
two insertion parts configured to be inserted into different slots among the plurality of slots;
a crown part connecting respective first ends of the two insertion parts; and

18 welding parts extending from respective second ends of the two insertion parts to be connected by welding, and
wherein the second-type conductor segment is disposed in a section having a relatively high voltage distribution ratio, and
wherein the first sheath parts of the first-type conductor segments and the second-type conductor segments are formed to surround an entire length of the conductor segment, and
wherein the second sheath part of the second-type conductor segments is formed to surround the first sheath part at the crown part, and
wherein the second sheath part comprises:
a first section and a second section having different average thicknesses,
wherein the first section includes a center bending part, and
wherein the first section has a greater coating thickness compared to the second section.

2. The stator of claim 1, wherein the stator coil comprises:
a plurality of phase power lines respectively connected to a three-phase AC power source, wherein a plurality of phase coils are connected to the plurality of phase power lines, and
wherein the stator coil comprises a plurality of layers spaced apart inside the slot along a radial direction of the stator core, and
wherein the plurality of phase power lines are connected to a conductor segment disposed at an outermost layer among the plurality of layers of the phase coils.

3. The stator of claim 2, wherein the plurality of layers comprise a first layer to an eighth layer,
wherein the eighth layer is disposed at an outermost side along the slot, and
wherein a conductor segment of the second-type conductor segment is disposed in the eighth layer.

4. The stator of claim 2, wherein the plurality of phase coils comprise:
a first coil part to an n-th coil part each having a plurality of conductor segments connected in series, and
wherein a conductor segment disposed in a first section to which one of the plurality of phase power lines is connected is a second-type conductor segment.

5. The stator of claim 4, wherein the first section includes the first coil part having a voltage distribution ratio of 60% or more.

6. The stator of claim 4, wherein the first section comprises:
the first coil part having a voltage distribution ratio of 60% or more and a second coil part connected in series to the first coil part and having a voltage distribution ratio of 50% or more.

7. The stator of claim 1, wherein an insulation distance between respective first sheath parts of conductor segments having different phases disposed at the outermost layer is 400 μm or more.

8. The stator of claim 7, wherein the crown part of a second-type conductor segment disposed at the outermost layer has the center bending part protruding along an axial direction and inclined sections connecting the bending part and the respective first ends of the two insertion parts.

9. The stator of claim 1, wherein a minimum thickness of the second sheath part of the second-type conductor segment disposed at the outermost layer is 200 μm or more.

10. The stator of claim 1, wherein the second sheath part is formed by impregnating the bending part of the second-type conductor segment into a solution forming the second sheath part.

11. The stator of claim 1, wherein the first sheath part is formed of enamel and the second sheath part is formed of epoxy.

12. The stator of claim 1, wherein the stator coil comprises:

coil ends protruding from both ends of the stator core along an axial direction; and a molding part formed to surround the coil ends with an electrical insulating member.

13. The stator of claim 12, wherein the molding part is vacuum-formed to allow air around the coil end to be discharged.

* * * * *